United States Patent [19]
Humphrey et al.

[11] Patent Number: 5,598,670
[45] Date of Patent: Feb. 4, 1997

[54] WALL MOUNTING SYSTEM FOR ELECTRICAL DEVICES

[75] Inventors: Phil A. Humphrey; Weldon C. Humphrey, both of Lyndonville, N.Y.

[73] Assignee: Thermo Plastic Works, Inc., Lyndonville, N.Y.

[21] Appl. No.: 291,398

[22] Filed: Aug. 16, 1994

[51] Int. Cl.⁶ .................................................. H02G 3/12
[52] U.S. Cl. ........................... 52/220.8; 52/28; 52/100; 174/48; 174/53; 439/535
[58] Field of Search ............................ 52/28, 173.1, 211, 52/212, 518, 220.8, 100; 174/53, 58, 65 R, 48, 65 G; 248/220.2, 544, 221.3, 909; 439/535

[56] References Cited

U.S. PATENT DOCUMENTS

| D. 343,825 | 2/1994 | Enderby | D13/152 |
|---|---|---|---|
| 2,202,147 | 5/1940 | Gerriets | 52/220.8 |
| 3,906,145 | 9/1975 | Carmichael | 174/61 |
| 4,229,916 | 10/1980 | White | 52/98 |
| 4,726,152 | 2/1988 | Vagedes | 52/28 |
| 4,854,093 | 8/1989 | Kellom | 52/28 |
| 4,875,318 | 10/1989 | MacLeod et al. | 52/211 |
| 4,920,708 | 5/1990 | MacLeod et al. | 52/60 |
| 5,000,409 | 3/1991 | MacLeod et al. | 248/205.1 |
| 5,133,165 | 7/1992 | Wimberly | 52/221 |
| 5,326,060 | 7/1994 | Chubb et al. | 52/211 X |
| 5,397,093 | 3/1995 | Chubb et al. | 52/28 X |

*Primary Examiner*—Michael Safavi
*Attorney, Agent, or Firm*—Howard M. Ellis

[57] ABSTRACT

An improved system for mounting electrical devices, such as lighting fixtures, switches, communication receptacles for telephones, television cables, etc., especially on exterior walls having lapped type siding or shingles comprises a one or two-piece wall mounting frame with an integrally molded electrical junction box which is flush mounted on a wall without cutting or drilling large openings to accommodate a protruding junction box, and without altering vertical supporting studs or other framing members when in alignment with such wall mounting systems.

21 Claims, 4 Drawing Sheets

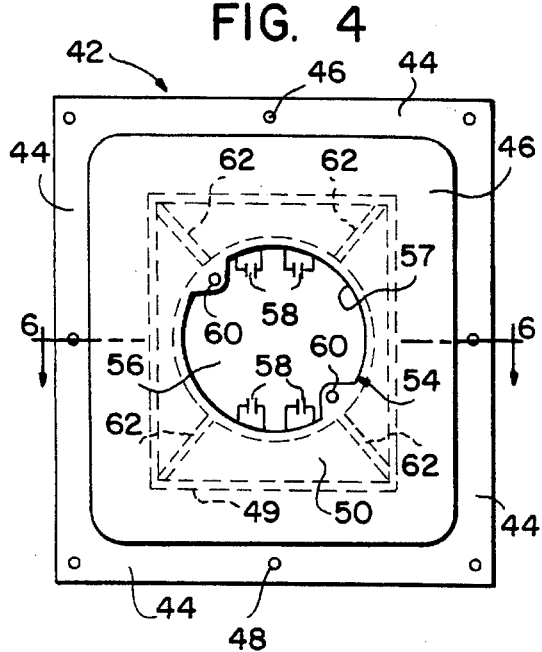
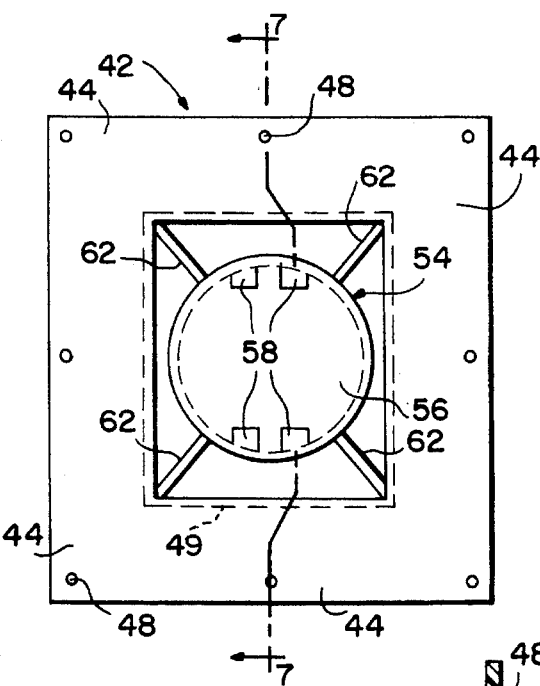
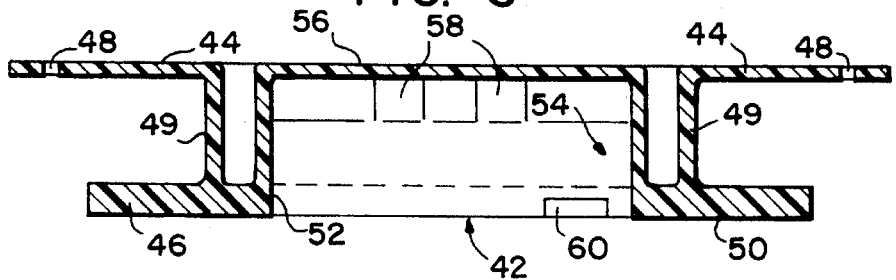
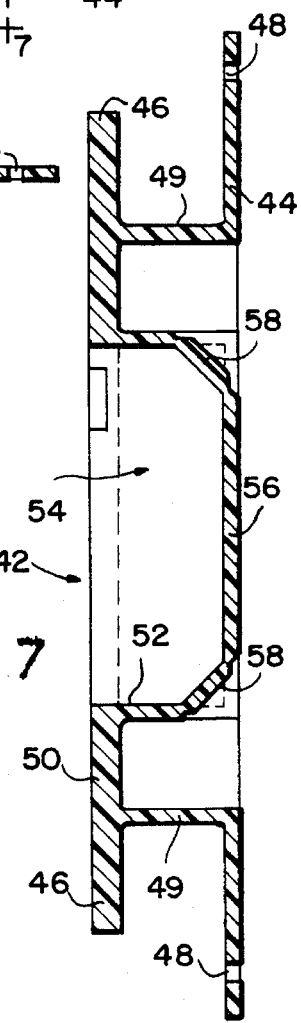

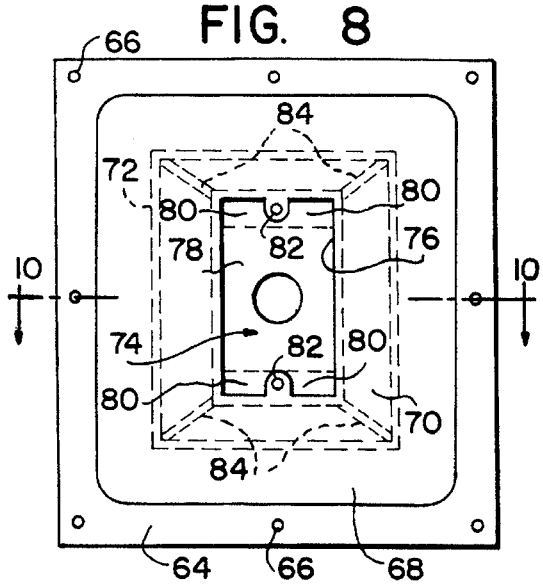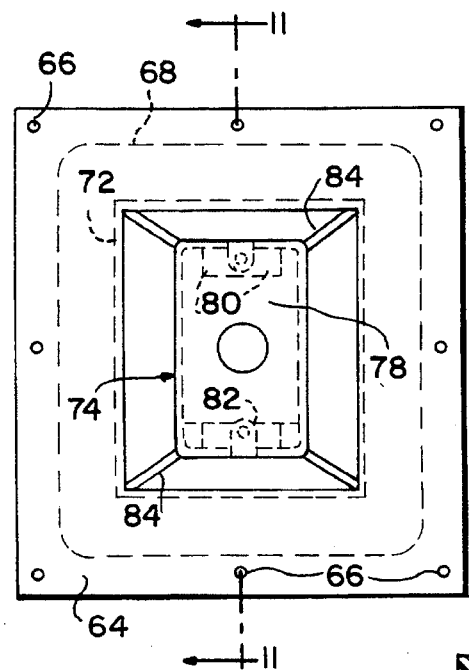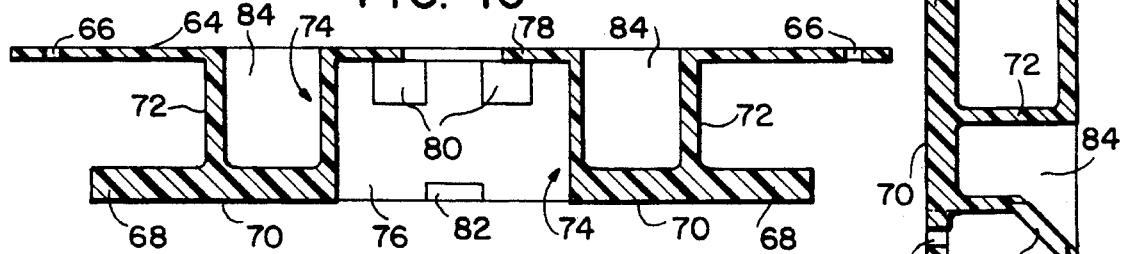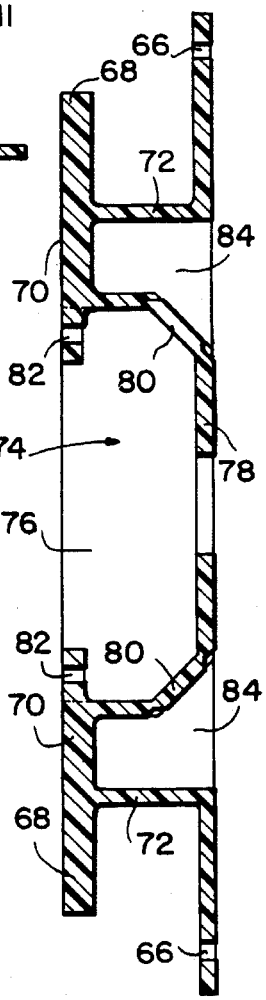

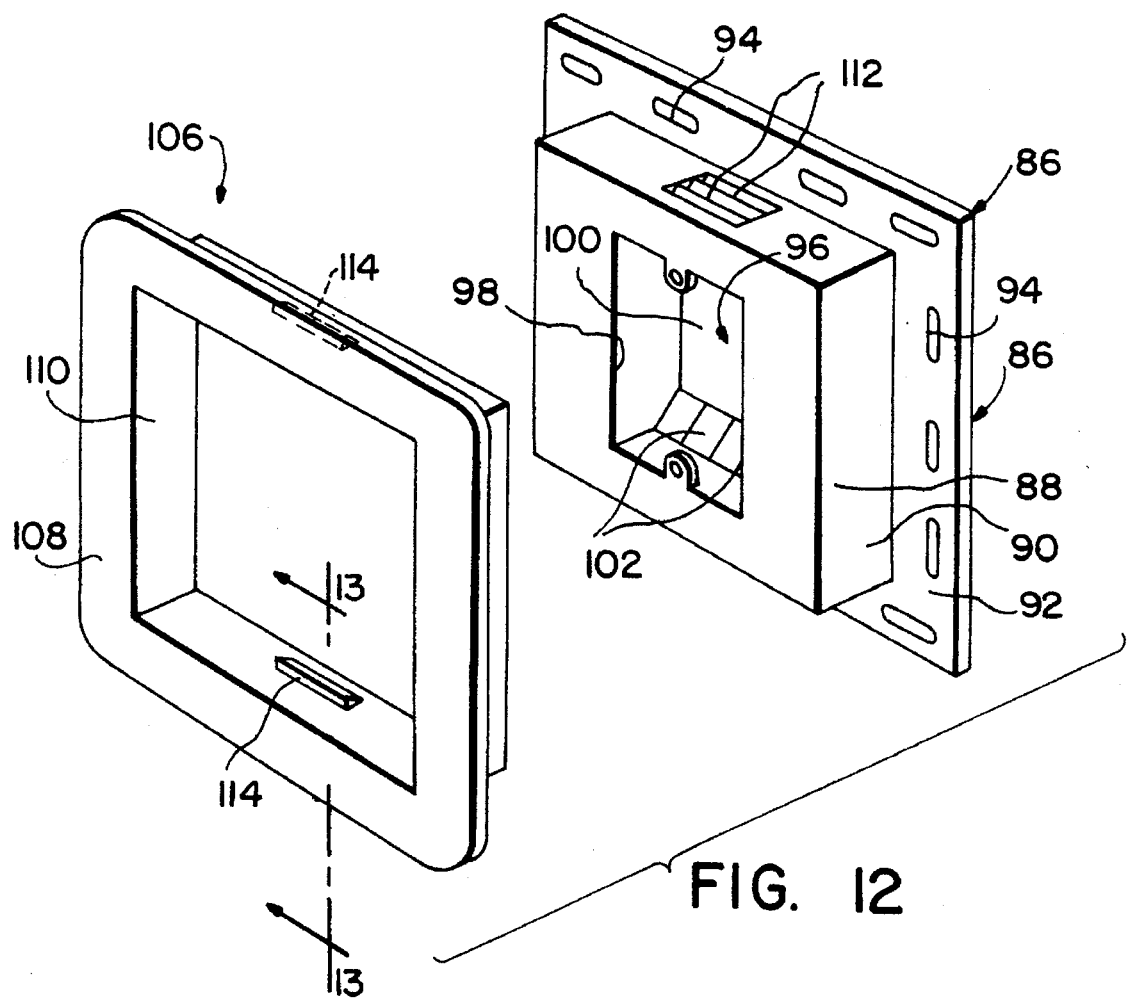
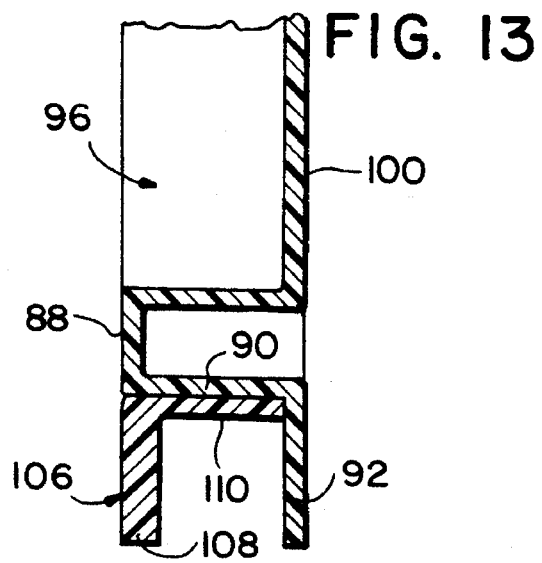

WALL MOUNTING SYSTEM FOR ELECTRICAL DEVICES

TECHNICAL FIELD

The present invention generally relates to devices used in conjunction with the installation of electrical and communication components, and more specifically, to improved wall assemblies for wiring and mounting devices, such as lighting fixtures, electrical outlets and switches; telephone, cable and other communication equipment.

BACKGROUND OF THE INVENTION

In the process of mounting a lighting fixture or electrical receptacle, for instance, it is usual and customary for interior construction to install electrical junction boxes against ceiling joists, wall studs or other upright structures used in framing buildings. Knock-out plugs are removed from the junction boxes which are then pre-wired with electrical conductors, telephone wires, television cable, and so forth. In subsequent steps of framing, wallboards or paneling having cut-outs for the junction boxes are applied to the walls and ceilings. In the final stages, lighting fixtures, switches, receptacles, etc., are wired to the junction boxes, secured with threaded fasteners, and outer plates affixed to the exterior to provide an attractive and finished appearance.

However, the installation of lighting fixtures, electrical switches, etc., to exterior walls present difficulties not normally experienced with the foregoing interior installations. Problems are especially prevalent when mounting electrical fixtures on the exterior sides of dwellings having irregular ceder shingles, lapped type siding with inclined surfaces, and so forth. Installation of electrical fixtures to exterior lapped walls would result not only in an unsightly appearance, but did not provide a secure weather-tight seal around the fixture. Frequently, efforts to solve these problems meant cutting out siding and mounting the fixture over the opening without the required support. This also provided an unfinished appearance because cutting often meant openings were irregular or oversized.

In an effort to solve the problems associated with exterior wall installations in which lapped type siding was employed various mounting systems were developed. Representative examples of outlet trim and wall mounting devices for electrical fixtures useful with lapped siding are disclosed by MacLeod et al in U.S. Pat. No. 4,920,708 and by Wimberly in U.S. Pat. No. 5,133,165. Such wall mounting systems were generally effective in providing a weather-tight seal and overcoming appearance problems, including eliminating the need for cutting out siding.

However, such devices have not been entirely satisfactory in all respects. For example, wall mounting brackets of the type disclosed by the MacLeod et al patent in U.S. Pat. No. 4,920,708 require first cutting out a portion of the front wall for installation of an electrical junction box. The junction boxes for installation in the MacLeod et al wall mounting brackets typically come equipped with holding flanges which must be opened and tightened manually by turning a threaded fastener after inserting into the front wall orifice of the mounting assembly to secure the box to the inside surface of the wall. Installation of such junction boxes during pre-wiring is often a tedious and unreliable process because the holding flanges often fail to readily open and securely engage with the inside portion of the wall mounting assembly. Furthermore, in the case of circular electrical junction boxes used in mounting heavier lighting fixtures there is a tendency for fixtures supported by cylindrically shaped junction boxes to turn or pivot on their axes because of the inability of the holding flanges on the junction boxes to reliably engage and lock against the front plastic wall of the mounting assembly to prevent such undesirable movement.

Carmichael discloses in U.S. Pat. No. 3,906,145 a mounting system for electrical fixtures wherein the electrical junction box is fabricated as an integral component with the wall mounting bracket. While the system of Carmichael eliminates the troublesome step of installing a separate electrical junction box this one-piece structure requires boring a large opening in the side wall of the building in order to install the unit. This can present special problems particularly when the side wall interior has other vertical supporting structures such as wall studs located where the electrical junction box portion of the assembly is to be positioned.

Accordingly, there is need for an improved wall mounting assembly for wiring and securing electrical devices, such as lighting fixtures, electrical outlets, receptacles for telephones and other communication equipment, etc., particularly on exterior walls of dwellings and other buildings whereby the installation process can be greatly facilitated without requiring significant structural alterations to mounting walls.

SUMMARY OF THE INVENTION

It is therefore a principal object of the invention to provide for improved wall assemblies for wiring and mounting electrical devices, particularly for exterior side walls having lapped type shingles or siding.

Structurally, the devices generally consist of a frame member having an interior flange suitable for mounting to a wall and an exterior flange member opposite the interior flange. The flanges are aligned in parallel planes and spaced from one another. This is accomplished by positioning between the two flanges an inwardly indented axial wall which provides a generally U-shaped cross-sectional channel encircling the device. In addition, there is a front wall surrounded by the exterior flange member, and an electrical box having an open end and a closed end opposite the open end. The open end of the electrical box is integral with a central opening in the front wall for access to the interior of the electrical box. The closed end of the electrical box extends rearwardly towards the interior flange but not beyond the plane of this flange.

Importantly, the electrical box and front wall are molded as an integral one-piece structural unit to avoid the tedious and time consuming task of mounting an independently fabricated junction box in a cut out opening in the front wall of the wall mounting assembly. By molding the electrical box and front wall as a one-piece integral unit possible slippage or pivoting of the box having a lighting fixture mounted thereon is eliminated. In addition, a key structural feature provides for the closed or back end of the integral electrical box being about even or flush with the interior flange so as to allow installation of the wall mounting assembly flush with the exterior surface of the side wall without having to cut or drill large openings in the wall to accommodate a protruding electrical box. These time saving features are also significant in also eliminating the potential problem with having to cut through vertical supports or wall studs which if present can interfere with electrical boxes extending through the exterior wall.

It is also an object of the invention to provide for a wall mounting assembly with flanges capable of concealing edges of siding adjacently positioned. That is, the front wall and surrounding exterior flange member in combination with the interior flange of the assembly serve as an attractive finishing trim by providing a generally U-shaped channel running the entire perimeter of the device which allows for receiving and concealing siding edges.

It is yet a further principal object of the invention to provide a wall mounting assembly as previously described molded as an integral one-piece plastic unit.

Similarly, the present invention contemplates as still a further principal object a wall mounting assembly wherein the above device is fabricated into a two-piece unit. That is, a wall mounting assembly wherein the interior flange, inwardly indented axial wall, front wall and electrical box are molded as an integral one-piece first component. The exterior flange member is molded as an independent second component. The molded first component and the molded second component preferably have means for interengaging together. The exterior flange member of the two-piece unit may also comprise an integral laterally extending flange and an integral continuous axial wall adapted for telescoping over the molded first component to interconnect with the axial wall of the first component.

A still further object is to provide a wall mounting assembly wherein the electrical box includes at least one knock-out at the closed end adapted for removal for passage of electrical conductors into the box. Such boxes preferably include electrical device mounting means, such as threaded holes for receiving fasteners for supporting lighting fixtures, receptacles and outer trim plates.

A more specific version of the foregoing preferred embodiment contemplated consists of an integrally molded one-piece wall mounting assembly for electrical devices. This comprises an interior flange and a front wall with a wall flange surrounding the front wall. The wall flange and interior flange are spaced from one another by an inwardly indented axial wall positioned therebetween. This provides a generally U-shaped cross sectional channel encircling the assembly for receiving and concealing siding edges. The width of the U-shaped channel may be made available in varying sizes depending on the width of the lapped siding and insulation beneath the siding with both the siding and insulation fitting between the flanges for a more finished appearance. The front wall is molded with an integral electrical junction box with an open end and a closed end opposite the open end. The open end of the electrical junction box is integral with a central opening in the front wall for access to the interior of the electrical junction box. The closed end of the electrical junction box extends rearwardly towards the interior flange but not beyond the plane of the flange.

As previously mentioned in connection with the first described wall mounting assembly, the device may also be fabricated as a two-piece wall mounting assembly for electrical devices. Accordingly, the invention includes devices consisting of (i) a one-piece plastic body having an integral front wall and an integral continuous axial wall extending from the front wall. In addition, there is an integral continuous flange for attachment of the one-piece plastic body to a wall of a building, and an electrical box having an open end and a closed end opposite the open end. The open end of the electrical box is integral with an opening in the front wall for access to the interior of the electrical box. The closed end of the electrical box extends rearwardly towards the integral continuous flange without going beyond the plane of the flange.

(ii) In addition, there is a removable plastic flange member having an integral laterally extending flange and an integral continuous axial wall adapted to be telescoped over the axial wall of the one-piece plastic body (i).

(iii) The one-piece plastic body (i) and the removable plastic flange member (ii) have interengaging means for selectively positioning the removable plastic flange member (ii) at predetermined distances relative to the integral continuous flange of the one-piece plastic body (i). This permits adjusting the width of the generally U-shaped slot between the two flanges in accordance with the various thicknesses of the siding edges and insulation concealed therein.

BRIEF DESCRIPTION OF THE DRAWINGS

For a further understanding of the invention and its characterizing features reference should now be made to the accompanying drawings wherein:

FIG. 4 is a front elevational view of an integral one-piece wall mounting assembly equipped with a cylindrically shaped electrical junction box;

FIG. 5 is a rear elevational view of the integral one-piece wall mounting assembly shown in FIG. 4;

FIG. 6 is a top sectional view of the integral one-piece wall mounting assembly taken along line 6—6 of FIG. 4;

FIG. 7 is a side sectional view of the integral one-piece wall mounting assembly taken along line 7—7 of FIG. 5;

FIG. 8 is a front elevational view of an integral one-piece wall mounting assembly equipped with a rectangular shaped electrical junction box;

FIG. 9 is a rear elevational view of the one-piece wall mounting assembly shown in FIG. 8;

FIG. 10 is a top sectional view of the integral one-piece wall mounting assembly taken along line 10—10 of FIG. 8;

FIG. 11 is a side sectional view of the integral one-piece wall mounting assembly taken along line 11—11 of FIG. 9;

FIG. 12 is a exploded perspective view of an integral two-piece wall mounting assembly, and FIG. 13 is an partial sectional view of an assembled integral two-piece wall mounting assembly taken along line 13—13 of FIG. 12.

DESCRIPTION OF THE PREFERRED EMBODIMENTS

Figure 1:
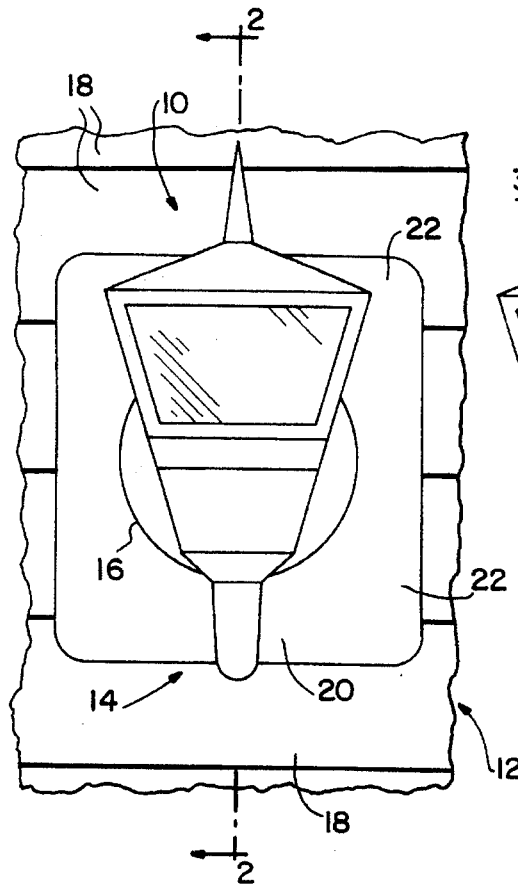
FIG. 1 is a front elevational view of the wall mounting assembly shown installed on a wall with a lighting fixture connected thereto.

Turning first to FIG. 1, there is shown the improved wall mounting assembly 10, preferably fabricated from plastics, such as high density polyethylene, polypropylene, polystyrene, or other polymeric material suitable for injection molding. Mounting assembly 10 is illustrated in FIG. 1 after being completely installed on side wall 12 of a dwelling with lighting fixture 14 mounted through fixture mounting plate 16. Adjacent edges of lapped siding 18 are positioned under exterior flange 20 of front wall 22 to provide an aesthetically attractive finished appearance.

Figure 2:
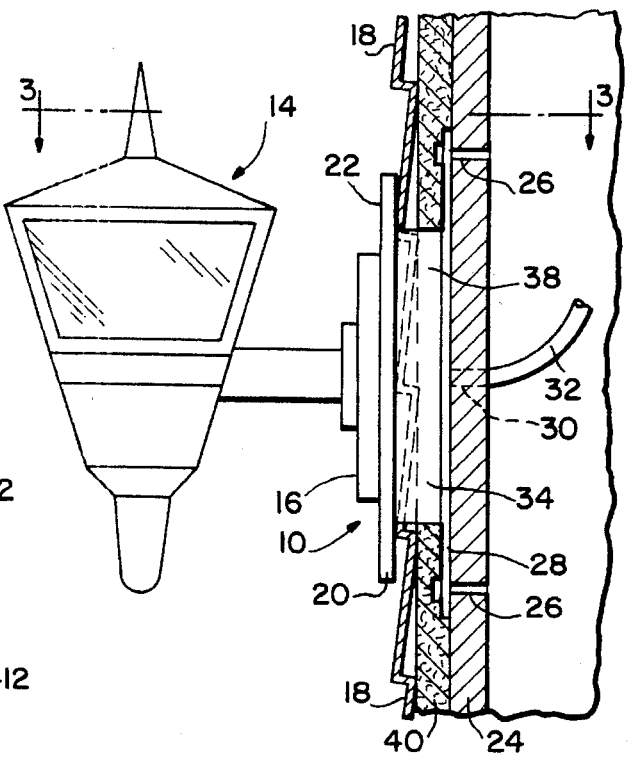
FIG. 2 is a side sectional view of the wall mounting assembly shown installed on a wall with a lighting fixture connected taken along line 2—2 of FIG. 1.
Figure 3:
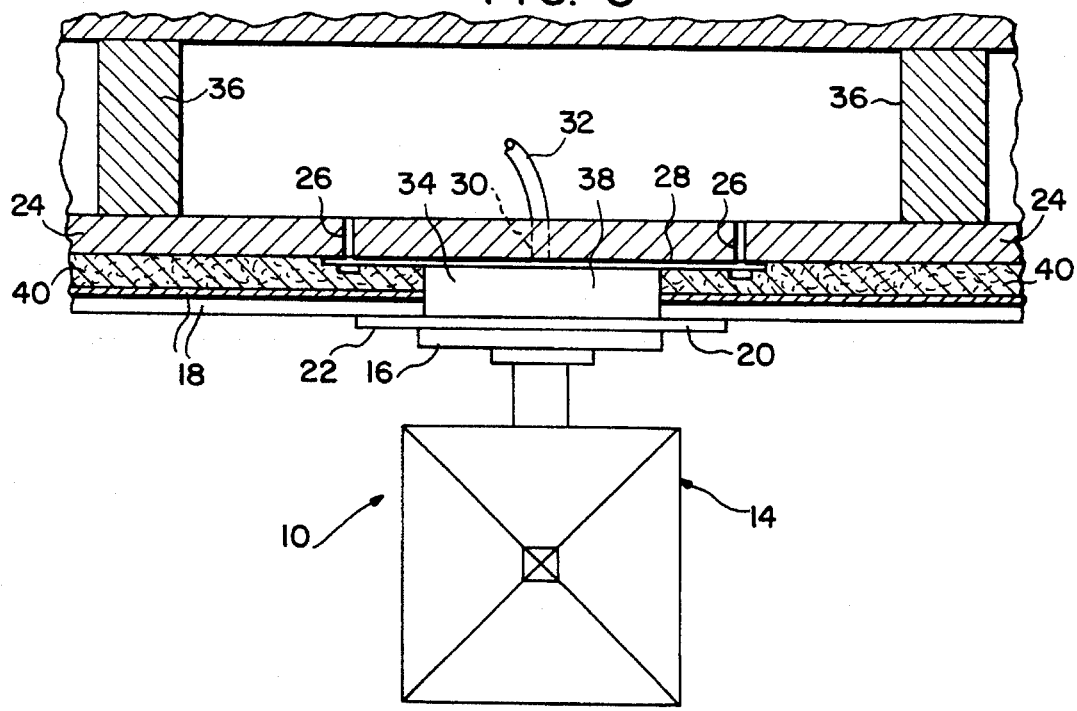
FIG. 3 is a top sectional view of the wall mounting assembly shown installed on a wall with a lighting fixture connected taken along line 3—3 of FIG. 2.

Wall mounting assembly 10, as best shown by FIGS. 2–3, is affixed to the exterior surface of framing plywood wall 24 by means of nail fasteners 26 driven through openings (not shown) in interior flange 28. A small diameter hole 30 drilled in framing plywood wall 24 permits electrical wire 32 to enter an opening in electrical junction box 34 (FIG. 2) for wiring lighting fixture 14. In this regard, it will be observed that mounting assembly 10 is affixed flush with the outer surface of framing plywood wall 24, and that no large openings need to be cut or drilled in the side wall of the dwelling to accommodate a protruding electrical junction box. Thus, wall mounting assembly 10 is also especially suitable for mounting immediately adjacent to vertical framing studs 36 without performing the inconvenient and time consuming task of making structural changes in the construction framing.

FIGS. 2–3 also illustrate inwardly indented axial wall 38 between interior flange 28 and exterior flange 20 defining a generally U-shaped channel encircling the wall mounting assembly. The U-shaped channel receives the edges of both insulation boards 40 and the edges of lapped siding 18 hiding them to provide a tight weather seal and an attractive professionally finished appearance to the installation.

FIGS. 4–7 provide more detailed views of a one-piece molded wall mounting assembly 42 for electrical devices, such as lighting fixtures which utilize cylindrically shaped electrical wiring boxes. FIG. 4 illustrates the integral assembly with an interior flange 44 encircling the device. Dimensionally, interior flange 44 is larger than the exterior flange member 46 to readily enable affixing the device against the sidewall of a dwelling with suitable fasteners applied through interior flange openings 48. An inwardly indented axial wall 49 separates the exterior flange member 46 and the interior flange 44. The flanges and axial wall provide a generally U-shaped cross sectional channel for concealing insulation and siding edges (not shown). This embodiment contemplates channels of fixed dimensions to accommodate insulation and siding combinations of predetermined thicknesses. That is, the mounting devices will be prefabricated with channels of varying widths to accommodate common thicknesses of siding and insulation combinations.

Assembly 42 includes a front wall 50 which is shown as a panel having an exterior flange 46. Front wall 50 consists of a supporting planar structure in the region between axial wall 49 and central opening 52. Opening 52 provides access to an electrical junction box 54 which is integral with front wall 50. Electrical junction box 54 is generally cylindrically shaped and open at the front wall 50 and closed at the rear wall 56. Rear wall 56 preferably has a plurality of knock-outs 58 adapted for removal to allow passage of an electrical conductor into the box for wiring an electrical device. In addition, electrical junction box 54 includes a plurality of threaded fixture supports 60 for securing a lighting fixture or other device to the mounting assembly. FIGS. 6–7 best illustrate the dept of junction box 54 as being flush with the plane of interior flange 44. It is to be understood that while junction box 54 is shown to be even with interior flange 44 the depth of the box may be shallower than illustrated. This allows the wall mounting assembly 42 to be conveniently flush mounted to the exterior surface of a side wall, for instance, without cutting or drilling a large opening or making structural alterations in vertical supporting studs in the wall which would otherwise be required for a protruding junction box. Finally, junction box 54 may also be reinforced by means of a plurality of angular supporting ribs 62 running between the cylindrical side wall of the box and axial wall 49.

FIGS. 8–11 also illustrate an integral one-piece molded wall mounting assembly of the invention for affixing and wiring electrical and communication devices through exterior walls having lapped siding/shingles. The particular embodiment of FIGS. 8–11 is especially useful in mounting and wiring devices, such as electrical outlets, switches, telephone receptacles and other communication equipment, like TV cables, etc. The assembly consists of an enlarged interior flange 64 with fastener openings 66 running the perimeter of the device. Axially spaced from interior flange 64 is exterior flange 68 which is a continuation of front wall 70. The interior and exterior flanges are spaced from one another by means of an inwardly indented axial wall 72, which although having one larger flange than the other nevertheless defines a slot having at least a partial U-shaped configuration. Front wall 70 includes a centrally positioned rectangular shaped electrical junction box 74 with an opening 76 for access to the interior, and a closed end 78 opposite the open end. Closed end 78 is shown extending rearwardly and is in alignment with interior flange 64. This permits flush mounting of the device to the exterior surface of a wall without cutting a large opening or altering vertical wall supporting studs which would otherwise be required for a protruding electrical box. Electrical junction box 74 also contains knock-outs 80 for removal during pre-wiring of the box, and threaded support members 82 at box opening 76 for securing the device being mounted therein. For added support, the integrally molded junction box 74 may have angular supporting ribs 84 extending from junction box side walls to inwardly indented axial wall 72.

FIGS. 12–13 disclose a two piece version of the wall mounting device wherein the electrical junction box is also an integrally molded component and extends rearwardly without exceeding the plane of the interior flange. The wall mounting frame, i.e. without the integrally molded junction box of the present invention is disclosed in U.S. Pat. No. 4,920,708 (MacLeod et al), the contents of which are incorporated-by-reference herein. The particular device as illustrated by FIGS. 12–13 with a rectangular shaped junction box is useful in exterior wall mountings for electrical devices, such as switches, receptacles, etc. However, it is to be understood the wall mounting assembly of FIGS. 12–13 may also have a cylindrically shaped junction box particularly adapted for lighting fixtures and also molded integrally with the assembly. In either case, the device of FIGS. 12–13 is especially useful for side walls having lapped shingles or vinyl/aluminum siding in which the edges are hidden in a generally U-shaped slot defined by opposing flanges to provide an attractive finished appearance.

The device of FIG. 12 consists of an integral one-piece plastic wall component 86 adapted to be fastened to the outer surface of a wall, wherein the component comprises a planar front wall 88, an integral continuous axial wall 90 extending from the periphery of front wall 88 and an integral continuous flange 92 extending outwardly from the edge of axial wall 90. The peripheral edge of flange 92 has openings 94 for wall fasteners. An electrical junction box 96 integral with front wall 88 has an open end 98, a closed end 100 opposite the open end, knock-outs 102 at the closed end for removal during pre-wiring, and threaded supports 104 for securing an electrical outlet, switch, etc. in the junction box during wiring.

As illustrated by FIG. 13, closed end 100 of junction box 96 is a planar structure which is even with the plane of integral continuous flange 92. This embodiment also includes devices in which closed end 100 of junction box 96 extends rearwardly to a depth which is shallower than axial wall 90. That is, the depth of junction box 96 measured by the location of closed end 100 may be less than actually shown by FIG. 13. In either case, closed end 100 should not extend beyond the plane of flange 92. This permits flush mounting of the one piece molded component 86 without boring a large opening in the wall to receive a protruding junction box. Advantageously, the presence of vertical supporting studs in proximity to wall component 86 do not restrict location of the device.

The second component of the two-piece version of the improved wall mounting assembly consists of a removable plastic flange unit 106 in the form of a molded integral peripheral frame suitable for telescoping over and interconnecting with one-piece molded component 86. Plastic flange member 106 consists of a laterally extending flange 108 and an integral continuous axial wall 110 extending from flange 108. When telescoped over the one-piece plastic wall unit 86 axial wall 110 slidably engages with continuous axial wall 90.

Continuous axial wall 90 of one-piece plastic wall component 86 includes axially spaced grooves 112 which are selectively engaged by axially spaced projections 114 on the inside surface of continuous axial wall 110 of removable plastic flange 106 when flange 106 is telescoped and moved axially towards wall component 86. Thus, after siding is applied against the side wall and siding edges are placed over integral continuous flange 92 removable plastic flange 106 is telescoped over axial wall 90 where projections 114 engage with one of spaced grooves 112, locking the plastic flange 106 in close engagement with the siding/insulation thereby holding the flange in proper adjusted position. The grooves 112 and projections 114 are preferably formed at diametrically opposed positions on their respective members.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

We claim:

1. A wall mounting assembly comprising a frame member having an interior flange suitable for mounting to a wall, an exterior flange member opposite said interior flange, said flanges being aligned in parallel planes and spaced from one another, a plurality of inwardly indented axial walls positioned between said flanges to provide a generally U-shaped cross sectional channel encircling said assembly, a front wall surrounded by said exterior flange member, and an electrical box having one or more adjoining side walls, an open end, and a closed end opposite said open end, each of said one or more side walls being spaced from said inwardly indented axial walls, the open end of said electrical box being integral with a central opening in said front wall for access to the interior of said electrical box, the closed end of said electrical box extending rearwardly towards said interior flange but not beyond the plane of said flange, said interior flange, exterior flange member, inwardly indented axial walls, front wall and electrical box being molded as an integral one piece unit.

2. The wall mounting assembly of claim 1 wherein the closed end of said electrical box is substantially even with the plane of said interior flange.

3. The wall mounting assembly of claim 1 wherein the interior flange is dimensionally larger than the exterior flange member.

4. The wall mounting assembly of claim 1 wherein the interior flange and exterior flange member have substantially the same dimensions.

5. The wall mounting assembly of claim 1 wherein the electrical box includes at least one knock-out at the closed end adapted for removal for passage of electrical conductors into said box, and means for mounting an electrical device thereto.

6. The wall mounting assembly of claim 1 wherein the electrical box is a junction box for mounting a lighting fixture.

7. The wall mounting assembly of claim 1 wherein the electrical box is a junction box for an electrical outlet.

8. The wall mounting assembly of claim 1 wherein the electrical box is a switch box.

9. The wall mounting assembly of claim 1 wherein the electrical box is a telephone line connection box.

10. The wall mounting assembly of claim 1 including at least one angular supporting rib interposed between said electrical box and said inwardly indented axial walls.

11. An integral one-piece molded wall mounting assembly for electrical devices, which comprises an interior flange, a front wall with a wall flange surrounding said front wall, said wall flange and interior flange being spaced from one another, a plurality of inwardly indented axial walls positioned between said interior flange and wall flange of said front wall to provide a generally U-shaped cross sectional channel encircling said assembly, said front wall having an electrical junction box with one or more adjoining side walls, an open end, and a closed end opposite said open end, each of said one or more side walls being spaced from said inwardly indented axial walls, the open end of said electrical junction box being integral with a central opening in said front wall for access to the interior of said electrical junction box, the closed end of said electrical junction box extending rearwardly towards said interior flange but not beyond the plane of said flange.

12. The one-piece molded wall mounting assembly of claim 11 wherein the interior flange is dimensionally larger than the wall flange.

13. The one-piece molded wall mounting assembly of claim 11 wherein the electrical junction box includes at least one knock-out at the closed end adapted for removal for passage of electrical conductors into said box, and means for mounting an electrical device thereto.

14. A wall mounting assembly which comprises (i) a one-piece plastic body having an integral front wall, a plurality of continuous axial walls integral with and extending from said front wall, a continuous interior flange for attachment of said one-piece body to a wall, and an electrical box having an open end, a closed end opposite said open end and one or more side walls, the open end of said electrical box being integral with an opening in said front wall for access to the interior of said electrical box, the closed end of said electrical box extending rearwardly towards said continuous flange interior but not beyond the plane of said flange, each of the one or more side walls of said electrical box being spaced from said plurality of continuous axial walls, (ii) a removable plastic flange member having an integral laterally extending flange and a plurality of integral continuous axial walls adapted to be telescoped over the plurality of axial walls of said one-piece plastic body (i), and (iii) said one-piece plastic body (i) and said removable plastic flange member (ii) having interengaging means for selectively positioning said removable plastic flange member (ii) at predetermined distances relative to the continuous flange of said one-piece plastic body (i).

15. The wall mounting assembly of claim 14 wherein the interior flange is dimensionally larger than the exterior flange member.

16. The wall mounting assembly of claim 14 wherein the interior flange and exterior flange member have substantially the same dimensions.

17. The wall mounting assembly of claim 14 wherein the interengaging means are provided at spaced positions along the integral continuous axial wall of said one-piece plastic body (i) and the integral continuous axial wall of said removable plastic flange (ii).

18. The wall mounting assembly of claim 14 wherein the electrical box includes at least one knock-out at the closed end adapted for removal for passage of electrical conductors into said box, and means for mounting an electrical device thereto.

19. A one piece molded electrical junction box comprising:

a box having an open rear side, a front wall opposite said open rear side, and a plurality of adjoining axial side walls;

an interior flange integral with said box, surrounding the outer perimeter of said open rear side of said box suitable for mounting said box to a wall;

an exterior flange member opposite said interior flange, said flanges being aligned in parallel planes and spaced from one another;

a compartment for housing electrical wires recessed within the front wall of said box, said compartment having an open end and a closed end opposite said open end, the closed end of said compartment extending rearwardly towards said interior flange but not beyond the plane of said interior flange, said compartment spaced from each of said plurality of adjoining axial side walls of said box;

said box, interior flange, exterior flange and compartment for housing electrical wires, being molded as an integral one-piece unit.

20. An electrical junction box comprising:

a box having an open rear side, a front wall opposite said open rear side, and a plurality of adjoining axial side walls;

an interior flange, integral with said side walls and surrounding said open rear side of said box, said flange being suitable for mounting said box to a wall;

a compartment for housing electrical wires recessed within the front wall of said box, said compartment having an open end and a closed end opposite said open end, the closed end of said compartment extending rearwardly towards said interior flange but not beyond the plane of said interior flange, said compartment spaced from each of said plurality of adjoining axial side walls of said box;

said box, interior flange, and compartment for housing electrical wires being molded as an integral one-piece first component;

a removable exterior flange opposite said interior flange for mounting to said first component, said flanges being aligned in parallel planes and spaced from one another;

said removable exterior flange being molded as an independent second component;

said first component and said second component having means for engaging with one another.

21. The wall mounting assembly of claim 20 wherein the exterior flange member comprises an integral laterally extending flange and an integral continuous axial wall adapted for telescoping over said molded first component to interconnect with the plurality of axial walls of said first component.

* * * * *